May 23, 1944.  H. G. HOLMES  2,349,552
WHEEL BALANCER
Filed Feb. 19, 1941  5 Sheets-Sheet 1
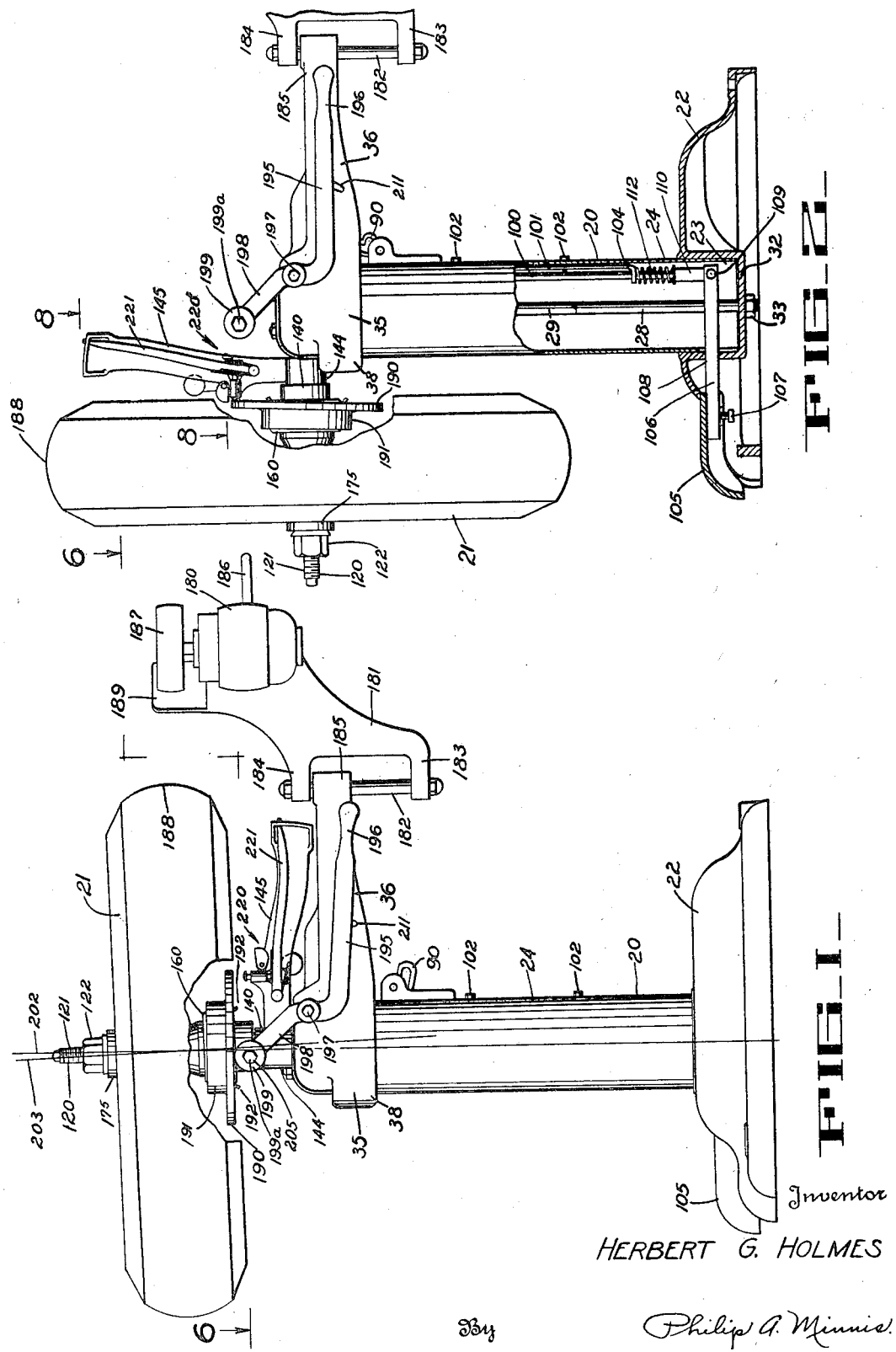
Inventor
HERBERT G. HOLMES
By Philip A. Minnis
Attorney

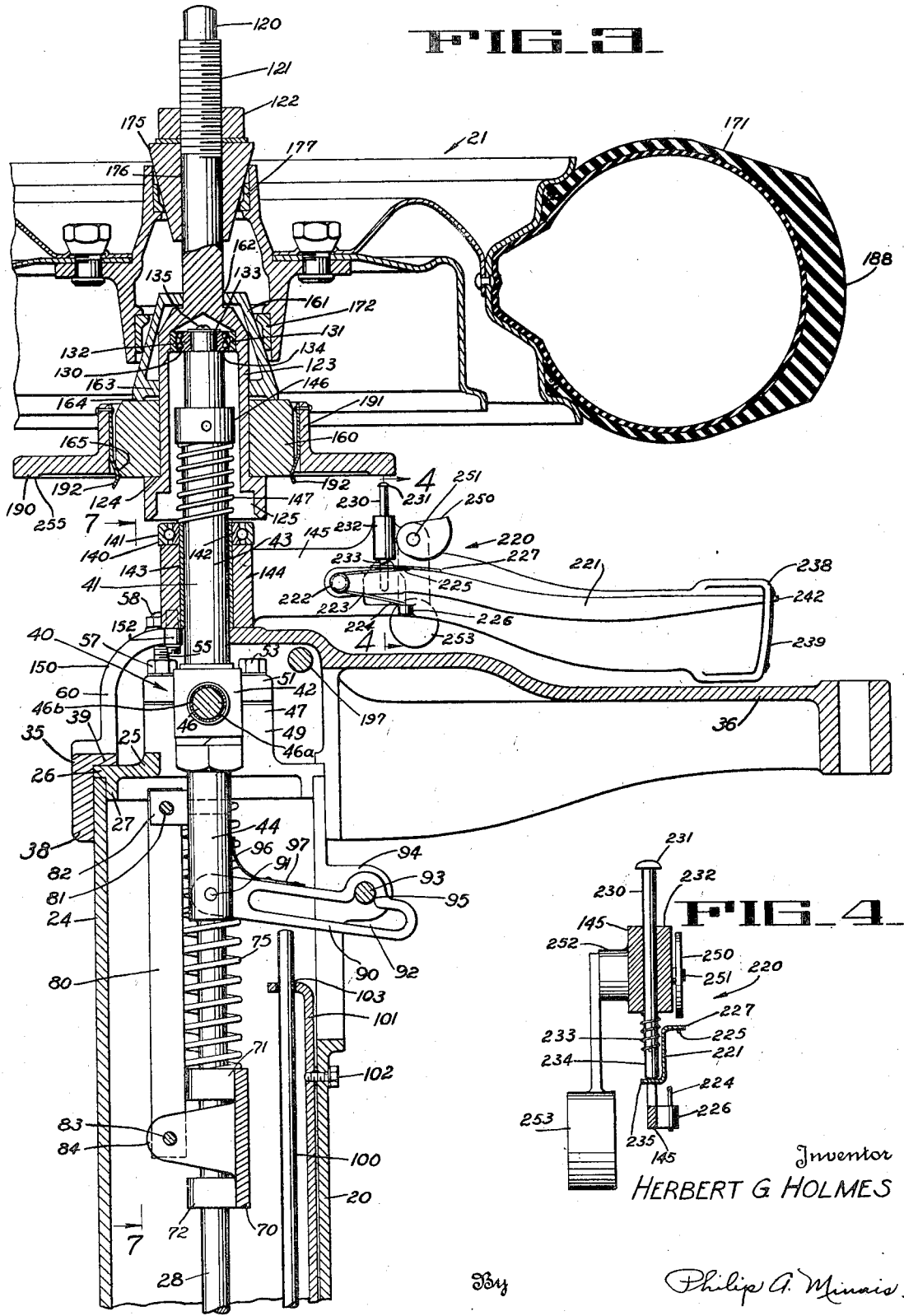

May 23, 1944.　　　　H. G. HOLMES　　　　2,349,552
WHEEL BALANCER
Filed Feb. 19, 1941　　　　5 Sheets-Sheet 3

Inventor
HERBERT G. HOLMES
By Philip G. Minnis
Attorney

May 23, 1944. H. G. HOLMES 2,349,552
WHEEL BALANCER
Filed Feb. 19, 1941 5 Sheets-Sheet 4
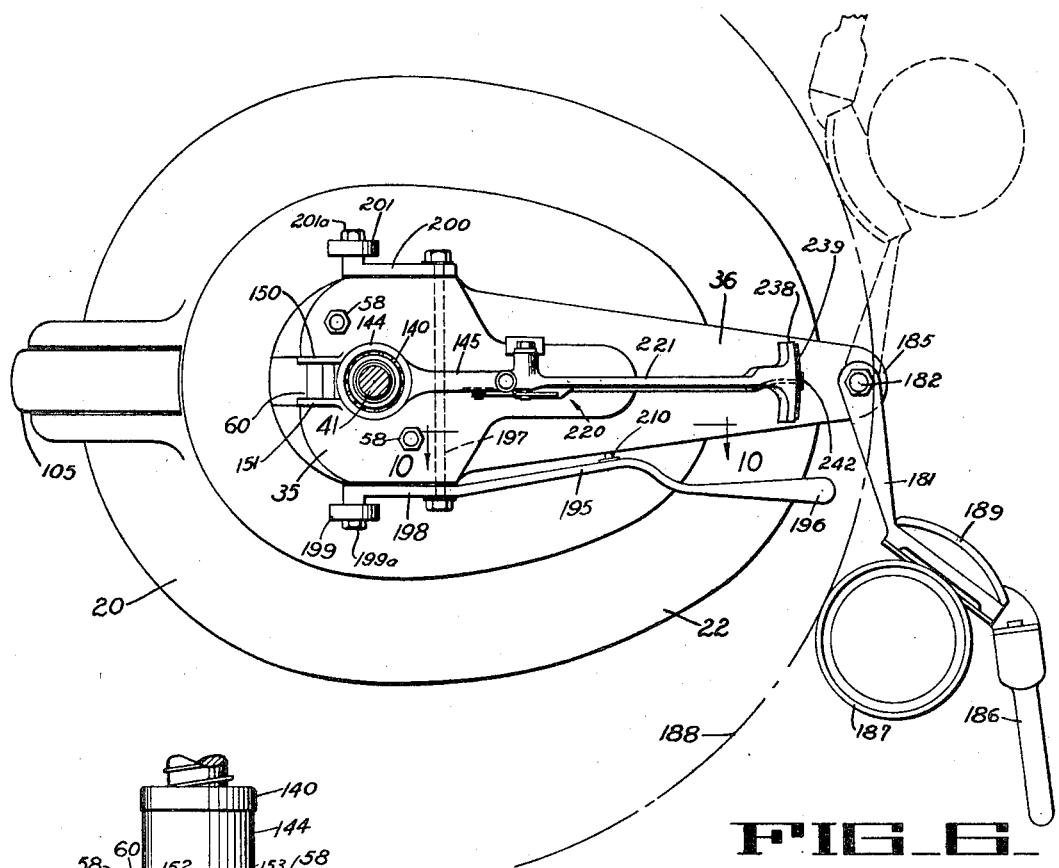
Inventor
HERBERT G. HOLMES
By Philip G. Minnis
Attorney Patented May 23, 1944

2,349,552

UNITED STATES PATENT OFFICE 2,349,552

WHEEL BALANCER

Herbert G. Holmes, Lansing, Mich., assignor to Food Machinery Corporation, San Jose, Calif., a corporation of Delaware Application February 19, 1941, Serial No. 379,580

24 Claims. (Cl. 73—53)

This invention relates to machines for testing the balance of rotative bodies, such as the wheels of an automobile.

In order to obtain safe and smooth-running operation of an automobile wheel at high speed it is essential that the wheel be accurately balanced, for even a slight amount of unbalanced weight will set up undesirable vibrations and, in the case of front wheels, dangerously erratic forces that may tend to impair the driver's control of the vehicle.

An object of this invention is to provide a machine upon which the wheel may be mounted and which will then enable an operator to determine whether the wheel is correctly balanced.

Another object of the invention is to provide a machine on which both the static and dynamic balance of the wheel may be tested.

A further object is to provide a wheel balancer with improved means for locating unbalanced weight in a wheel.

Another object is to provide a wheel balancer with improved means for testing a wheel for dynamic balance and for indicating the location and amount of any existing unbalanced weight.

Other objects will be evident after the following disclosure of a machine in which the invention is embodied.

In the drawings:

Fig. 1 is a side elevation of the machine showing the wheel mounted thereon and positioned with its axis upright.

Fig. 2 is a similar view with the wheel positioned with its axis horizontal. Part of the pedestal has been broken away to disclose mechanism within.

Fig. 3 is an enlarged fragmentary vertical section of Fig. 1.

Fig. 4 is an enlarged fragmentary section taken as indicated by the arrows 4—4 in Fig. 3.

Fig. 6 is a horizontal section taken as indicated by the arrows 6—6 in Fig. 1.

Fig. 7 is a vertical section taken as indicated by the arrows 7—7 in Fig. 3.

Fig. 8 is an enlarged fragmentary view taken as indicated by the arrows 8—8 in Fig. 2.

Figure 5:
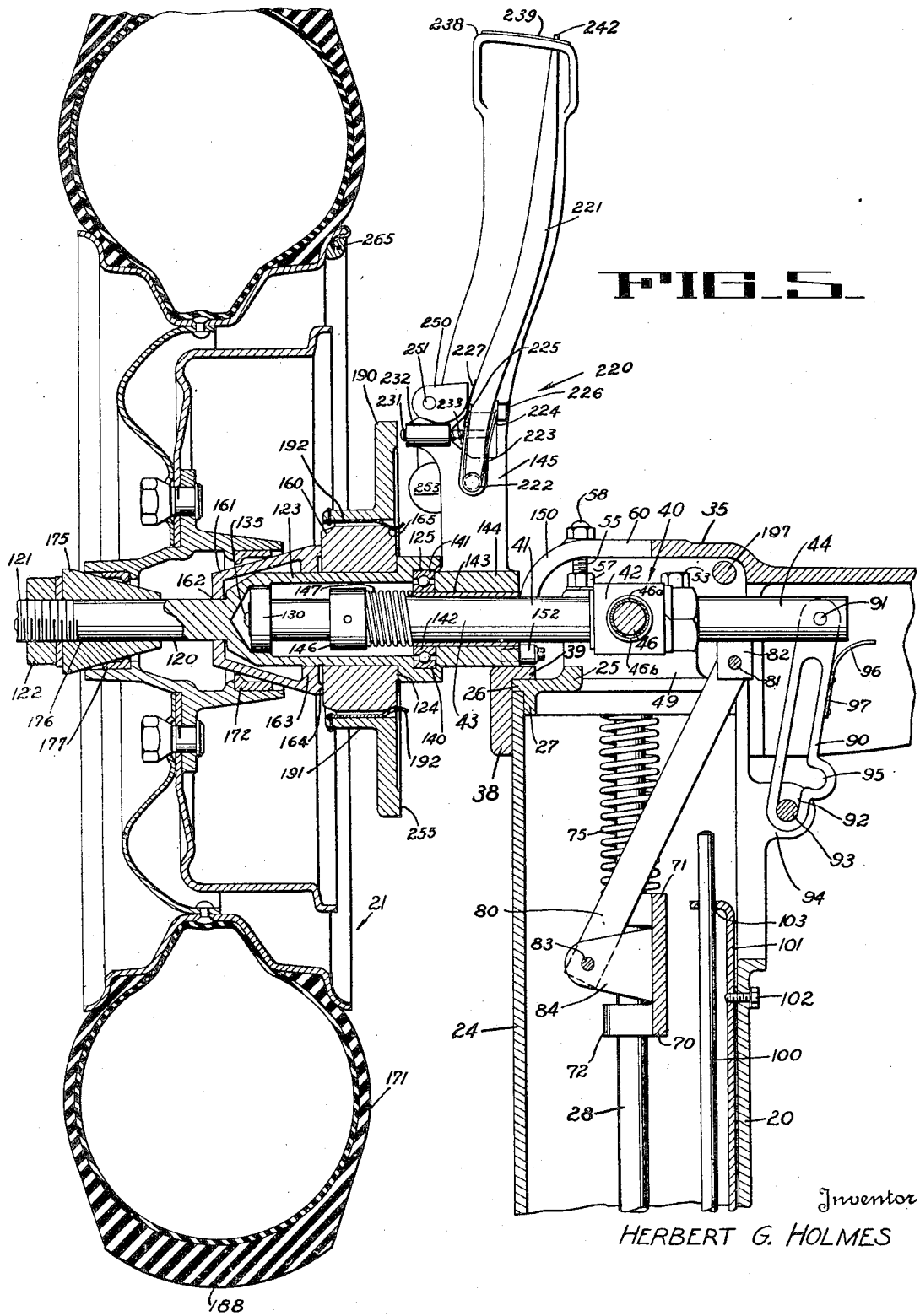
Fig. 5 is a view similar to Fig. 3 with the wheel positioned with its axis horizontal.

In general the testing machine comprises a pedestal 20 (Fig. 1) which provides the frame for supporting the instrumentalities by means of which the static and dynamic balance of an automobile wheel, such as 21, may be determined.

One of the features of this machine is that the wheel 21 is positioned with its axis upright, as shown in Fig. 1, during part of the testing operation, and with its axis horizontal, as shown in Fig. 2, during other parts of the testing operation without removing the wheel from the machine.

The supporting frame will now be described in detail. The pedestal 20 (Fig. 2) comprises a base casting 22 which is adapted to rest upon the floor. The base casting 22 has a well 23 formed therein which receives the foot of a hollow column 24 which is rigidly secured therein. A casting 25 (Fig. 3) has a horizontal flange 26 which rests upon the top edge of the column 24 and has a vertical depending flange 27 which fits within the walls of the column. The casting 25 (Fig. 7) is securely held in place in the top of the column.

Two vertical rods 28, 29 have their upper ends secured in the casting 25 at 30 and 31, respectively. The lower ends of the rods 28, 29 project downwardly through apertures in the bottom 32 of the well 23 (Fig. 2) and the projecting ends are threaded to receive nuts, such as 33. A casting 35 (Figs. 1 and 2) fits on top of the column 24 and has a laterally extending arm 36. As can be seen in Fig. 3, the casting 35 has a skirt 38 which encompasses the column 24 and a shoulder 39 which rests on the upper face of the flange 26 of the casting 25.

An adjustable support, indicated generally at 40 (Figs. 3 and 5) is mounted in the frame of the machine for swinging movement. The support 40 comprises an arbor 41 rigidly mounted in a trunnion 42 intermediate the ends of the arbor so that a portion 43 of the arbor extends on one side of the trunnion 42 and another portion 44 extends on the other side.

The trunnion 42 is mounted for rotation in the frame by means of stub shafts 45, 46 (Fig. 7) forming part of the trunnion and received in bearings 47, 48. The lower halves 49, 50 of the bearings are formed integrally with the casting 25, while the upper halves 51, 52 are removable caps attached to the lower halves by cap screws 53 and studs 55, provided with nuts 57.

Preferably the stub shafts 45 and 46 are fitted with thin bushings 45a and 46a respectively, made of Bakelite or fibre. These bushings are slotted along one side, as at 45b and 46b, so as to enable them to be contracted slightly when the bearing caps 51 and 52 are screwed down tight, and exert considerable friction on the stub shafts so that while the arbor 41 can be readily shifted by hand from vertical to horizontal position and vice versa, it is not free to do so unless some force is exerted on it. The slots 45b and 46b in the bushings also permit compensation for wear which may be accomplished by screwing down the bearing caps 51 and 52 to tighten up the bushings.

As can be seen in Fig. 3, the cap 51 of the bearing 47 is secured to the lower half 49 of the bearing by the cap screw 53 and the stud 55 and nut 57. The cap of the bearing for stub shaft 46 is similarly attached. The stud 55 (Fig. 5) projects upwardly through an aperture in the casting 35 and a nut 58 is threaded on the stud 55 to hold the casting in place with its shoulder 39 on the flange 26 of casting 25 and its skirt 38 encompassing column 24. Both studs 55 (Fig. 7) project up through the casting 35 and are provided with nuts 58 (Fig. 6).

Figure 9:
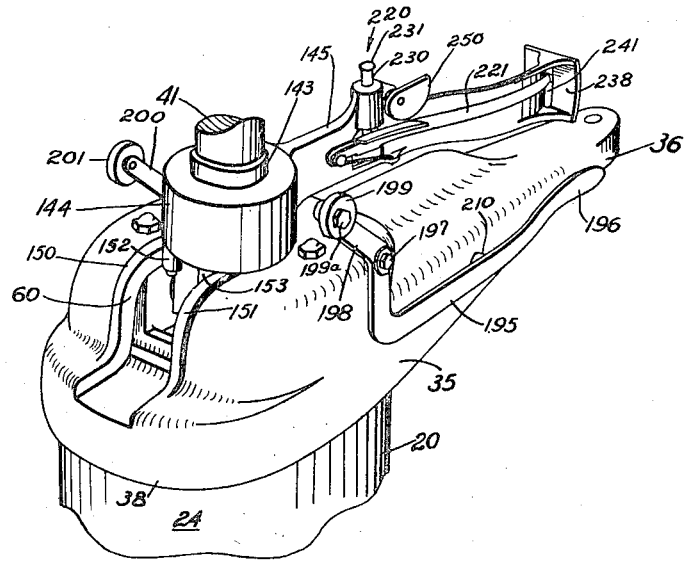
Fig. 9 is a perspective view showing the mechanism located under the wheel at the top of the pedestal.

It will be understood that the arbor 41 does not rotate upon its axis, being fixed in the trunnion 42 by means of which it is mounted for swinging movement about the axis of stub shafts 45, 46 through ninety degrees from the vertical position shown in Fig. 3 to the horizontal position shown in Fig. 5. A slot 60 (Fig. 9) is formed in the casting 35 to permit the above-described movement of the arbor 41 which projects therethrough.

Means disposed in the pedestal 20 are provided for facilitating and controlling the movement of the arbor from one adjusted position to the other and for securing it in the selected position of operation. Referring to Figs. 3, 5, and 7, a cross head 70 is slidably mounted on the rods 28, 29 by means of ears 71, 72 having aligned apertures through which the rod 28 passes, and ears 73, 74 having aligned apertures through which the rod 29 passes. Compression springs 75, 76 encompassing the rods 28, 29, respectively, are interposed between the cross-head 70 and the bottom of the casting 25. The cross-head is connected to the portion 44 of the arbor 41 by double links 80, attached by means of a pin 81 to a lug 82 secured to the arbor 41, and attached by means of a pin 83 to an ear 84 formed on the cross-head 70.

A latch 90 (Figs. 3 and 5) is provided for holding the arbor 41 in either horizontal or vertical position. The latch is connected by means of a pin 91 to the projecting end 44 of the arbor 41. A slot 92 is formed in the latch. A pin 93 having its ends secured in ears 94 formed on the column 24, passes through the slot 92. When the arbor 41 is in the horizontal position shown in Fig. 5 the pin 93 is in the end of the slot 92. A recess 95 communicating with the slot 92 is formed in the latch 90 to receive the pin 93 when the arbor 41 is in the vertical position shown in Fig. 3. A leaf spring 96 secured to the latch 90 at 97 engages the arbor 41 to insure the seating of the pin 93 in the recess 95 and to resiliently maintain the latch in engagement with the pin when the arbor is in the vertical position.

Means are provided for releasing the latch to permit the arbor to be swung to the horizontal position. A push rod 100 is supported for vertical movement in a bracket 101 secured inside the wall of the column 24 by screws 102. The push rod passes through apertures formed in the horizontally-extending end portions of the bracket as shown at 103 (Fig. 3) and at 104 (Fig. 2). The push rod 100 is operated by a pedal 105 adjustably secured to a lever 106 by a set screw 107. The lever 106 passes through an aperture 108 in the wall of the well 23 and the bottom of this aperture is used as a fulcrum when the pedal is depressed to elevate the inner end of the lever 106 which is pivotally attached at 109 to a clevis 110 secured to the end of the push rod 100. A compression spring 112 interposed between the clevis 110 and the bracket 101 urges the push rod downwardly and lifts the pedal 105 after it has been depressed. When the operator steps on the pedal 105 the push rod 100 engages the latch 90 (Fig. 3) and lifts it off the pin 93, thus releasing the arbor 41 for swinging on its trunnion.

It will be understood that in operation the horizontal position of the arbor 41 as shown in Fig. 5 is maintained by the weight of the wheel being supported thereby, the springs 75 and 76 being of such size as to readily yield under the weight of the wheel so as to permit the arbor to assume this position. At the same time it should be noted that the springs 75 and 76 are sufficiently strong so that when no wheel is mounted on the arbor and the latch is in released position, they elevate the arbor to an angle of about 45 degrees, that is to say, about midway between its vertical and horizontal positions. This is advantageous in that it makes it easier for the operator to mount a heavy wheel accurately on the arbor, than it would be if he had to mount the wheel on the arbor in either its vertical or horizontal positions.

This arrangement is particularly helpful to the operator when the wheel has to be mounted on a face plate in which case the holes in the wheel have to be placed in register with the holes in the face plate for attachment thereto. The face plate method of mounting wheels has not been disclosed herein because it was deemed to be well-known in the art and is disclosed in the patent to Morse, 2,136,633, issued November 15, 1938.

A spindle 120 (Fig. 3) is supported on the arbor 41. The outer end of the spindle is threaded at 121 to receive a nut 122. The inner end of the spindle is formed as a hollow cylindrical quill 123 having an external shoulder 124 and a counterbore 125. The spindle is supported on the arbor by a self-aligning ball bearing 130. The outer race 131 of the bearing is fitted into the quill 123. The inner race 132 is carried on the end 133 of the arbor 41 which is reduced in diameter to form a shoulder 134 against which the race is held by a retaining washer and screw 135. Two annular rows of balls are disposed between the inner and outer races and the ball-engaging surface of the outer race is spherical to permit the spindle to tilt on the arbor as well as to rotate thereon.

A second bearing 140 is provided for confining the spindle to rotation when in the horizontal position (Fig. 5). The outer race 141 of the bearing 140 fits in the counterbore 125 of the quill 123. The inner race 142 is carried on the projecting end of a bushing 143 which is secured in the hub 144 of an arm 145. The bushing 143 has a sliding fit on the portion 43 of the arbor 41. A collar 146 is secured to the arbor 41 and a compression spring 147 is interposed between the collar and the end of the bushing 143 to urge the bushing to the right in Fig. 5 and withdraw the bearing 140 from the counterbore 125 when the arbor 41 is swung to the vertical position (Fig. 3) so that in this position the spindle 120 is supported solely by the bearing 130 which permits it to tilt.

Means are provided for positively inserting the bearing 140 in the counterbore 125 as the arbor 41 is moving down to the horizontal position. The inner end of the hub 144 is always in engagement with the casting 35. The margins 150, 151 (Figs. 6 and 9) of the slot 60 are raised to form a cam track on which the hub slides as the arbor 41 is swung from one position to the other. The hub is prevented from turning by guide pins 152, 153 mounted on the hub and engaging the walls of the slot 60. The slot and its margins are disposed eccentrically with respect to the axis of the trunnion 42. As viewed in Fig. 3, the distance from the axis of trunnion shaft 40 to the face of the hub 144 is less than the distance between these two points when the parts are in the position shown in Fig. 5.

In other words, the margins 150, 151 of the slot 60 act as a cam to slide the bushing 143 outwardly on the arbor 41 when it is swung down to the horizontal position, thus automatically introducing the bearing 140 into the counterbore 125 to prevent the spindle from tilting and to confine it to rotation on a horizontal axis. Conversely, when the arbor is swung up to the vertical position this construction permits the spring 147 to remove the bearing 140 so that the spindle is free to tilt on the bearing 130.

The spindle 120 is adapted to have a wheel mounted thereon for testing. A collar 160 (Fig. 3) fits on the quill 123 against the shoulder 124, and a cone 161 is provided for the reception of the wheel. The cone 161 has an aperture 162 in the end through which the spindle passes. It also has an internal flange 163 which engages the exterior of the quill 123 and a downwardly projecting flange 164 which engages the collar 160. Preferably the cone is held in place by a light press fit with the spindle and quill.

The wheel 21 with the tire 171 thereon is placed on the spindle with the outer race 172 of the inner wheel bearing seated on the cone 161. A cone 175 having a bore 176 which fits the spindle 120 is slid on to seat in the outer race 177 of the outer wheel bearing. The nut 122 is then screwed onto the threaded portion 121 of the spindle and serves to clamp the wheel onto the spindle with its axis in alignment with the axis of the spindle by reason of the centering cones 161, 175. The wheel and spindle will thereafter move in unison as an integral body.

In order to spin the wheel when the arbor is in the upright position a motor 180 (Figs. 1 and 6) is provided. The motor is attached to a bracket 181 having a pin 182 secured in ears 183, 184 formed in the bracket. The pin 182 is rotatable in an apertured boss 185 formed in the end of the arm 36 which is integral with the frame casting 35. A handle 186 is attached to the bracket 181 which the operator grasps to swing the bracket on its pivot pin 182 to engage the driving wheel 187 of the motor 188 with the periphery 188 (Fig. 6) of the tire. To enable the operator to stop the automobile wheel 21 from spinning a brake shoe 189 is secured to the bracket 181. This shoe can be brought into frictional engagement with the tire by swinging the bracket around to the broken line position shown in Fig. 6.

A wobble plate 190 (Fig. 3) is carried by the collar 160. The plate has a hub 191 which freely encompasses the collar but is frictionally held in place thereon by a series of leaf springs 192 secured inside the hub 191 and bearing against a spherical surface 165 formed on the collar. In this manner the wobble plate is mounted for universal tilting movement on the collar, but will be held in any adjusted position by the friction of the leaf springs 192 on the collar. The periphery of the plate is provided with a scale 193 (Fig. 8) which encompasses it and is graduated, preferably in 5° units, and divided in half, so that there are two successive scales, each covering 180° of the periphery of the plate and each reading from 0 to 36.

The wobble plate 190 is adapted to be adjusted so that it will run true while the wheel 21 is spinning, even though the wheel may gyrate or wobble due to dynamic unbalance. A lever 195 (Figs. 1 and 6) having a handle 196 is secured to the end of a shaft 197 rotatably mounted in the casting 35. The lever 195 has an upwardly inclined arm 198 which carries a disc or button 199 held in place by a cap screw 199a. Secured to the other end of the shaft 197 and disposed parallel to the arm 198 is another arm 200 having a disc or button 201 secured thereto by cap screw 201a. The buttons 199 and 201 are identical in size and are disposed with their axes in alignment, but, as best seen in Figs. 1 and 2, the discs are eccentrically mounted on their respective cap screws so that they may be adjusted for proper height and locked in position by the cap screws.

The operator may grasp the handle 196 and depress the lever 195 to raise the discs 199, 201 into engagement with the plate 190 while it is spinning in unison with the wheel. The pressure of the discs on the plate adjusts it to run true—that is to say, in a single plane without any wobble. As will presently be explained, the axis 203 of the spindle 120, during rotation with a wheel thereon, will not be coincident with the true vertical 202 if the wheel is dynamically unbalanced, but will assume a gyratory motion, in which event the plate 190 is adjusted relative to the collar 160, this being possible on account of the frictional engagement of the springs 192 with the collar.

Figure 10:
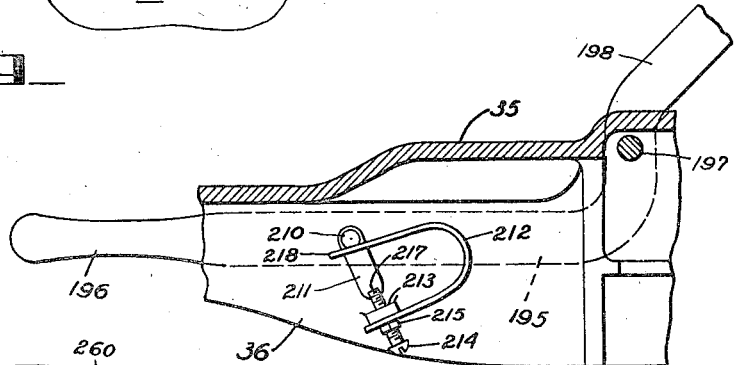
Fig. 10 is a fragmentary section taken as indicated by the arrows 10—10 in Fig. 6.

When the handle 196 is released the lever 195 is rotated counterclockwise (Fig. 1) to lower the discs away from the plate. The lever has a pin 210 (Fig. 10) secured thereto which projects through a slot 211 in the arm 36 of the casting 35. A leaf spring 212 bent in a U shape is secured at one end to a lug 213 formed integrally with the casting by a set screw 214 threaded into the lug and provided with an adjustment lock nut 215. The free end 216 of the spring bears upwardly against the pin 210 to lift the arm 195. The set screw is adjusted so that its tip 217 acts as a limit stop which the end 216 of the spring engages when the lever 195 is depressed, and thus serves to determine the extent of elevation of the discs 199, 201. Preferably, as shown in Figs. 1 and 6, the common axis 205 of these discs is offset from, and lies outside the plane of, the vertical axis 202 of the plate 190. By employing these two offset discs the plate can be accurately and dependably leveled by depressing the lever 195.

When the spindle 120 (Fig. 2) is swung to the horizontal position, an indicator means, indicated generally at 220, is automatically disposed in cooperative relation with the wobble plate 190. It will be recalled that the arbor 41 (Fig. 3) has slidably mounted thereon the hub 144 of an arm 145. The hub and arm occupy the position shown in Fig. 3 when the arbor is in the vertical position.

A pointer 221 is pivotally mounted on the arm 145 at 222. The pointer is urged upwardly by a wire spring 223 coiled about the pivot 222. The ends 224, 225 project outwardly from the pivot. The lower end 224 (Figs. 3 and 4) is anchored in a lug 226 formed integrally with the arm 145. The upper end 225 underlies and bears upwardly against a flange 227 formed on the pointer 221.

An indicator pin 230 (Figs. 3 and 4) having a button head 231 is slidably mounted in a boss 232 formed integrally with the arm 145. A spring 233 coiled about the pin 230 and bearing against the under side of the boss 232 urges the pin downwardly in Fig. 4 to maintain the end 234 of the pin in engagement with a flange 235 on the pointer 221.

The arm 145 has a pad 238 (Fig. 6) formed at the end thereof for supporting a plate 239 (Fig. 8) having a scale 240 marked thereon. The pointer 221 projects through a slot 241 in the plate and is provided with an indicator 242 which cooperates with the scale 240. The scale is graduated on either side of the zero point to indicate units of weight to be added to the inside and the outside of the automobile wheel. It will be noted in Fig. 8 that the plate 239 has inscriptions thereon which designate the left and right positions of the scale 240 as "inside" and "outside," respectively. The scale plate 239 is adjustably mounted on the pad 238 by means of four pins 244 which pass through slots 245 in the plate 239 and are secured in the pad 238.

In the position of the parts of the indicator means 220 shown in Fig. 3 the pointer 221 under the influence of the spring 223 is swung upwardly, its upward movement being limited by the engagement of the end of the pointer in the end of the slot in the scale plate 239. The indicator pin 230, however, does not engage the wobble plate 190 because the arm 145 is removed therefrom by withdrawal of its hub 144 and bearing 140 from the spindle counterbore 125, as previously explained. The indicator means 220 is thus inoperative when the arbor is vertical.

When the arbor is swung down to the horizontal position (Fig. 5) the hub 144, in moving toward the spindle to insert the bearing 140 in the counterbore, also moves the indicator means 220 toward the wobble plate 190. A cam 250 is secured to a counter shaft 251 rotatably mounted in the arm 145 which has a boss 252 (Fig. 4) formed therein to provide adequate bearing for the shaft. A counterweight 253 is secured to the opposite end of the shaft 251. The cam 250 is adapted to engage the flange 227 of the pointer. When the arbor is upright the cam 250 is disposed as shown, but when the arbor is swung down the counterweight 253 turns the cam 250 clockwise with respect to the arm 145 bringing it into engagement with the flange 227 and moving the pointer 221 clockwise on its pivot 222 to the position shown in Fig. 5. The indicator pin 230 under the influence of its spring 233 (Fig. 4) follows the pointer 221 and withdraws from the plate 190.

When the arbor is in the horizontal position shown in Fig. 5 the counterweight 253 may be manually lifted to turn the cam 250 through one-hundred-eighty degrees to the position shown in Figs. 2 and 8. In this manner the pointer 221 can be released to the influence of its spring 223 which causes the indicator pin 230 to be projected toward the wobble plate 190 so that the head 231 of the pin engages an annular surface 255 formed on the face of the plate. The automobile wheel 21 can now be manually turned, the wobble plate 190 turning therewith. If the plate is tilted on the collar 160 the pin 230 will reciprocate as its head 231 follows the surface of the wobble plate 190. This movement of the indicator pin will be communicated to the pointer 221, and the movement of its indicator 242 (Fig. 8) over the scale 240 may be observed in connection with the position of the indicator pin 230 with respect to the scale 193 on the periphery of the wobble plate 190.

The operation of the machine is as follows: The automobile wheel 21 with the tire 171 mounted thereon and properly inflated is placed on the spindle 120. This can be conveniently done by releasing the latch 90 with the pedal 105 so that the arbor assumes an inclined position of about 45 degrees intermediate the vertical and horizontal positions shown in Figs. 1 and 2, respectively, the springs 75 and 76 serving to maintain it in this position until the wheel is mounted on the spindle. Upon placing the wheel on the spindle its weight swings the arbor into horizontal position as shown in Figs. 2 and 5, and the wheel is then secured on the spindle as previously described by tightening the nut 122.

The springs 75, 76 (Figs. 5 and 7) are compressed by the upward movement of the cross head 70 when the arbor is lowered and serve to cushion the descent of the wheel assembly and prevent sufficient shock to spring the arbor, or otherwise injure the machine. The frictional grip of the bushings 45a and 46a also assists the springs in cushioning the shock when the wheel assembly is lowered into horizontal position.

Figure 11:
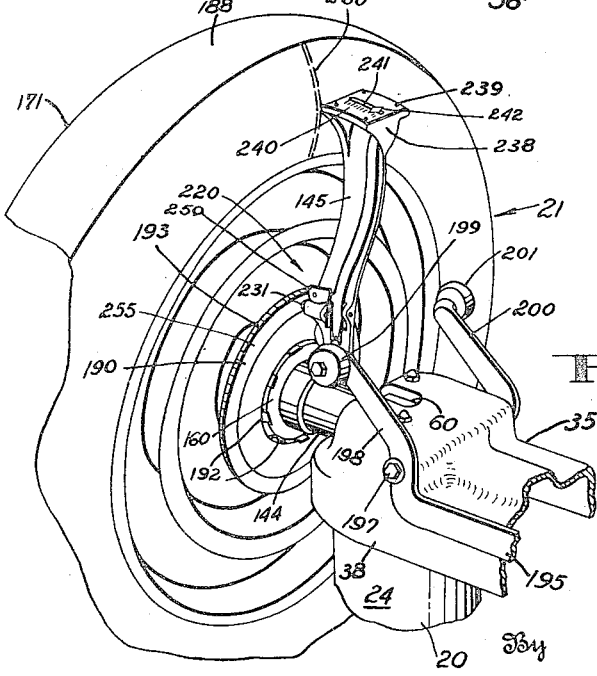
Fig. 11 is a perspective view of the wheel in position for the static balance test.

With the wheel and arbor now in the position shown in Fig. 5, the wheel and spindle assembly is supported for free rotation on a horizontal axis by the bearings 130 and 140, and if the wheel is statically unbalanced it will rotate until its heaviest portion comes to rest at the bottom of the wheel. After the wheel has come to rest a chalk mark 260 (Fig. 11) is made on the inner side wall of the tire 171 opposite the slot 241 in the indicator plate 239. The mark 260 will be one-hundred-eighty degrees from the heavy spot in the wheel. A balance wheel 265 (Fig. 5) of well-known construction is now placed on the rim of the wheel at the chalk mark. The wheel is then manually turned ninety degrees and released. If the wheel turns it is not yet balanced. If the balance weight goes up it is too light and a heavier weight should be substituted. If the balance weight goes down it is too heavy and a lighter weight should be used. If the wheel cannot be balanced by using one weight, two weights of equal size are placed equal distances on each side of the chalk mark and moved around until the wheel is statically balanced. When the wheel will rest in any position it is statically balanced.

The operator then swings the wheel and arbor to the upright position (Fig. 1) where it is retained by the latch 90. The wheel is then rotated at high speed by starting the electric motor 180 and engaging its drive wheel 187 with the tread of the tire. The bracket 181 is then swung away to disengage the driving wheel 187 from the tire allowing the wheel undergoing test to spin freely.

It will be recalled that in this position the spindle 120 is supported solely by the spherical bearing 130 (Fig. 3) so that as the wheel spins the spindle is free to gyrate if the wheel is dynamically unbalanced. When this occurs the spindle axis 203 (Fig. 1) generates an inverted cone and the upper end of the spindle makes one circuit of the base of the cone each time the wheel makes a revolution. The operator now depresses the lever 195 to engage the discs 199, 201 with the wobble plate 190 which is thereby adjusted to remove any wobbling motion from it and to cause it to run true. The lever 195 is then released and the wheel is brought to a stop by engaging the brake shoe 189 with the tire.

Depressing the pedal 105 to release the latch 90, the operator thereupon lowers the wheel to the position shown in Fig. 2 where the spindle 120 is supported on the bearings 130 and 140 (Fig. 5) with its axis horizontal, the bearing 140 having been automatically inserted in the counterbore 125 by the camming action of the slot margins 150, 151 (Fig. 9) on the hub 144. If the wheel is dynamically unbalanced the wobble plate 190, as shown in Fig. 2, will now be found to be inclined with respect to the spindle axis, having been adjusted to this position when it was trued up by the rollers 199, 201.

The operator now raises the counterweight 253 to the position shown in Fig. 2 and slowly turns the wheel by hand. The indicator pin 230 following the inclined plate 190 oscillates the pointer 221, causing the indicator 242 (Fig. 8) to move back and forth on the scale 240. The scale plate is adjusted relative to the pad 238 by sliding it on the pins 244 until the zero point of the scale 240 is at the mid-point of the travel of the indicator 242. When this adjustment has been made the indicator will move to a position, such as that shown, for example, in full lines in Fig. 8, opposite "2" on the "outside" end of the scale and then will move back to the broken line position opposite "2" on the "inside" end of the scale, these two positions being the limits of movement of the indicator as the wheel is turned.

The wheel is stopped at the maximum "inside" position where the indicator 242 is in the broken line position. A balance weight of the size indicated, in this case 2 ounces, is applied to the inside rim of the wheel opposite the slot 242 in the plate. The number on the scale 193 opposite the indicator pin 230 is noted in order to determine the angular position of the weight on the wheel. The operator then turns the wheel one-hundred-eighty degrees as indicated by the indicator pin 230 on the scale 193, or until the same number appears opposite the indicator pin, this being the corresponding number in the second scale. It will be recalled that there are two 180° scales on the plate. Corresponding numbers in these two scales are arranged diametrically opposite to facilitate turning the wheel 180° at this time. A 2-oz. balance weight is then applied to the "outside" rim of the wheel. In this manner, the wheel is dynamically balanced by placing two equal balance weights exactly one-hundred-eighty degrees apart, one on the inside rim, the other on the outside rim. The indicator means 220 serves to show the exact points on the wheel that the weights should be applied and also the size of the weights to be used.

It will be understood that the scale 240 is calibrated for average size and weight wheels and therefore larger and heavier wheels will require slightly heavier balance weights than indicated on the scale. Conversely, smaller wheels will require the application of slightly lighter weights. In order, therefore, to make certain that the proper size weights have been applied, and that they have been accurately placed, it is advisable to re-check the wheel for dynamic balance by raising the arbor to vertical position again, and repeating the operations of spinning the wheel, and adjusting the wobble plate. When the arbor is again lowered and the indicating means 220 is operated, the pointer 221 should remain at zero, if the wheel is dynamically balanced because in that case the wobble plate 190 will not be tilted with respect to the spindle when the plate is trued up, on account of the fact that the wheel itself will run true. If the re-check shows that the wheel is still dynamically unbalanced it shows either that the operator applied the wrong size of weights or did not place them accurately, and he may then apply the proper size weights or correct their placement as may be necessary until the test shows that the wheel is properly balanced.

Having thus described my invention and in what manner the same may be used, what I claim as new and desire to protect by Letters Patent is:

1. A wheel balancer comprising, a frame, a support mounted in said frame for movement from a vertical to a horizontal position, a spindle adapted to have a wheel mounted thereon, means for mounting said spindle on said support for rotation and tilting with respect thereto, and means automatically operable upon movement of said support to the horizontal position to prevent said spindle from tilting on said support and to confine said spindle to rotation on a horizontal axis.

2. A wheel balancer comprising, a frame, a support mounted in said frame for movement from a horizontal position to a vertical position and adapted to be secured in either position, a spindle adapted to have a wheel mounted thereon, bearing means for mounting said spindle for rotation and tilting on said support, a second bearing means adapted to engage said spindle when said support is in the horizontal position to prevent tilting of said spindle with respect to said support and confine the spindle to rotation about a horizontal axis, and means automatically operable upon movement of said support to the horizontal position for engaging said second bearing with said spindle.

3. A wheel balancer comprising, a frame, an arbor mounted on a trunnion in said frame for movement about a horizontal axis, a spindle adapted to have a wheel mounted thereon, a bearing on said arbor to support said spindle for universal tilting movement thereon when said arbor is in vertical position, a second bearing movable axially with respect to said arbor and adapted to cooperate with said first bearing in the horizontal position of said arbor to confine said spindle to rotation on a horizontal axis, and means automatically operable upon movement of said arbor to vertical position to render said second bearing inoperative.

4. A wheel balancer comprising, a frame, an arbor mounted on a trunnion in said frame for movement about a horizontal axis, a spindle adapted to have a wheel mounted thereon, a bearing on said arbor to support said spindle for universal tilting movement thereon when said arbor is in vertical position, a second bearing movable axially with respect to said arbor and adapted to cooperate with said first bearing in the horizontal position of said arbor to confine said spindle to rotation on a horizontal axis, and means actuated by movement of said arbor to horizontal position to move said second bearing to operative position.

5. A wheel balancer comprising, a frame, an arbor mounted on a trunnion in said frame for rotation about a horizontal axis, means on said arbor for supporting a wheel for rotation, resilient means on said frame and connecting means secured to said arbor and cooperating with said resilient means for cushioning the movement of said arbor to the horizontal position.

6. A wheel balancer comprising, a frame, an arbor mounted on a trunnion in said frame for rotation about a horizontal axis, means on one end of said arbor for supporting a wheel for rotation, spring means on said frame below the arbor, and pivotally mounted means intermediate said spring means and the other end of the arbor and cooperating with said spring means for cushioning the movement of the arbor to the horizontal position.

7. A wheel balancer comprising a frame, means adapted to have a wheel mounted thereon for testing, means to support said mounting means, said supporting means being adjustable in said frame to position the wheel with its axis upright or horizontal, said supporting means when positioning the wheel with its axis upright permitting the wheel to wobble when it has been set spinning, a member carried by said mounting means to rotate in unison with the wheel and adapted to be tilted with respect thereto, means to engage said member while the wheel is spinning and wobbling to cause said member to run true, means operable when said supporting means is adjusted to position the wheel axis horizontal to indicate the adjustment of said member relative to said mounting means, said indicating means indicating the dynamic unbalance of the wheel, and means automatically operable upon movement of said supporting means to position the wheel with its axis upright to render said indicating means inoperable with respect to said member.

8. A wheel balancer comprising a frame, means adapted to have a wheel mounted thereon for testing, means to support said mounting means, said supporting means being adjustable in said frame to position the wheel with its axis upright or horizontal, said supporting means when positioning the wheel with its axis upright permitting the wheel to wobble when it has been set spinning, a member carried by said mounting means to rotate in unison with the wheel and adapted to be tilted with respect thereto, means to engage said member while the wheel is spinning and wobbling to cause said member to run true, said supporting means including an auxiliary means adapted to engage said mounting means to support the wheel for rotation on a horizontal axis, means on said frame to cause said auxiliary supporting means to engage said mounting means upon movement of said supporting means to position the wheel with its axis horizontal, and indicating means on said auxiliary supporting means adapted to cooperate with said member when said auxiliary means is engaged with said mounting means to indicate the amount of wobble of said member when the wheel is turned on a horizontal axis.

9. A wheel balancer comprising a frame, means adapted to have a wheel mounted thereon for testing, means to support said mounting means, said supporting means being adjustable in said frame to position the wheel with its axis upright or horizontal, said supporting means when positioning the wheel with its axis upright permitting the wheel to wobble when it has been set spinning, a member having a peripheral graduated scale, said member being carried by said mounting means to rotate in unison with the wheel and adapted to be tilted with respect thereto, means to engage said member while the wheel is spinning and wobbling to cause said member to run true, said supporting means including an auxiliary means adapted to engage said mounting means to support the wheel for rotation on a horizontal axis, means on said frame to cause said auxiliary supporting means to engage said mounting means upon movement of said supporting means to position the wheel with its axis horizontal, indicating means on said auxiliary supporting means adapted to cooperate with said member when said auxiliary means is engaged with said mounting means, said indicating means including a contact to engage said member and movable in response to the wobble thereof when the wheel is turned, a pointer actuated by said contact, and a scale cooperating with said pointer, the dynamic unbalance of the wheel being indicated in amount by said pointer on said pointer scale and in location by the corresponding position of said contact with respect to said peripheral scale on said member.

10. A wheel balancer comprising a frame, means adapted to have a wheel mounted thereon for testing, means to support said mounting means, said supporting means being adjustable in said frame to position the wheel with its axis upright or horizontal, said supporting means when positioning the wheel with its axis upright permitting the wheel to wobble when it has been set spinning, a member having a peripheral graduated scale, said member being carried by said mounting means to rotate in unison with the wheel and adapted to be tilted with respect thereto, means to engage said member while the wheel is spinning and wobbling to cause said member to run true, said supporting means including an auxiliary means adapted to engage said mounting means to support the wheel for rotation on a horizontal axis, indicating means on said auxiliary supporting means adapted to cooperate with said member when said auxiliary means is engaged with said mounting means, said indicating means including a contact to engage said member and movable in response to the wobble thereof when the wheel is turned, and a device to automatically maintain said contact out of engagement with said member when said supporting means is being adjusted to position the wheel axis horizontal, said device being manually operated to release said contact for engagement with said member after said supporting means has been adjusted to position the wheel axis horizontal.

11. In a wheel balancer having an arbor provided with means for mounting a wheel for testing and adjustable to position the wheel with its axis horizontal or vertical, and a wobble plate associated with the wheel and adapted to be set to run true while the wheel is spinning with its axis upright: indicating means adapted to cooperate with said wobble plate comprising an arm slidable on said arbor, an indicator pin mounted in said arm for reciprocation with respect thereto and adapted to contact said wobble plate when said arm is slid on said arbor toward the wheel, a pointer mounted on said arm for oscillation, said pin and pointer being connected for transmitting movement of one to the other, a cam rotatably mounted on said arm, and a counterweight to position said cam in restraining engagement with said pointer when said arbor is moved to horizontal position, said cam being removed from restraining position to free said arm by manually lifting said counterweight.

12. A wheel balancer comprising, a frame, an arbor mounted in said frame for movement about a horizontal axis, a spindle adapted to have a wheel mounted thereon, a bearing on said arbor to support said spindle for rotation and tilting movement when said arbor is in vertical position, a second bearing slidably mounted on said arbor, and means including a cam on said frame to slide said second bearing into engagement with said spindle when said arbor is moved to horizontal position to confine said spindle to rotation.

13. A wheel balancer comprising, a frame, an arbor mounted in said frame for movement about a horizontal axis, a spindle adapted to have a wheel mounted thereon, a bearing on said arbor to support said spindle for rotation and tilting movement when said arbor is in vertical position, a second bearing slidably mounted on said arbor, spring means urging said second bearing out of engagement with said spindle, and means including cam means fixed on said frame to slide said second bearing into engagement with said spindle when said arbor is moved to horizontal position to confine said spindle to rotation.

14. A wheel balancer comprising a frame, means adapted to have a wheel mounted thereon for testing, means to support said mounting means, said supporting means being adjustable in said frame to position the wheel with its axis upright or horizontal, said supporting means when positioning the wheel with its axis upright permitting the wheel to wobble when it has been set spinning, a wobble plate carried by said mounting means to rotate in unison with the wheel and adapted to be tilted with respect thereto, means to engage said wobble plate when the wheel is spinning with its axis upright to cause said wobble plate to run true, said engaging means being mounted on said frame and being engageable with said wobble plate only when said supporting means is adjusted to position the wheel with its axis upright, and means operable only when said supporting means is adjusted to position the wheel with its axis horizontal for indicating the adjustment of said wobble plate relative to said mounting means.

15. In a wheel balancer, a vertically disposed arbor, means for supporting a wheel for free rotation and universal tilting movement on said arbor, whereby unbalance of the wheel will cause wobbling thereof, a wobble plate rotatable with the wheel and tiltable with respect to the axis of the wheel, a pair of rollers engageable with the plate for shifting the same until it runs true, means for movably mounting said rollers coaxially disposed with respect to each other and with their common axis offset with respect to the vertical axis of the arbor, and means for limiting the movement of said rollers into predetermined contact with said plate.

16. A wheel balancer comprising a frame, a support rotatable about a horizontal axis on said frame, means located on one side of said axis for mounting a wheel for rotation on said support, spring actuated counterbalancing means intermediate the support and said frame on the opposite side of said axis for automatically positioning said support in an inclined position intermediate the vertical and horizontal positions thereof on said axis to facilitate mounting a wheel on said wheel mounting means.

17. In a wheel balancer a frame, a support on said frame and movable about a horizontal axis, means on one side of said axis for supporting a wheel for rotation on said support, a linkage mechanism pivotally mounted on the support on the other side of said axis, and resilient means interposed between the frame and linkage mechanism and cooperating therewith for cushioning the movement of the support to horizontal positions.

18. In a wheel balancer a frame, an arbor pivotally mounted on said frame for movement to vertical and horizontal positions, means on one end of said arbor for supporting a wheel for rotation, a linkage mechanism pivotally mounted on the other end of said arbor, and a spring interposed between said frame and linkage mechanism and cooperating therewith for cushioning the movement of said arbor to the horizontal position.

19. In a wheel balancer a frame, an arbor pivotally mounted on said frame for movement to vertical and horizontal positions, means on one end of said arbor for supporting a wheel for rotation, a linkage mechanism pivotally mounted on the other end of said arbor, a spring interposed between said frame and linkage mechanism and cooperating therewith for cushioning the movement of said arbor to the horizontal position, and a latch associated with said arbor and frame for restraining the arbor against movement of the wheel supporting end thereof below its horizontal position and for automatically locking said arbor when the wheel supporting end thereof is in vertical position.

20. In a wheel balancer a frame, an arbor pivotally mounted on said frame for movement to vertical and horizontal positions, means on one end of said arbor for supporting a wheel for rotation, a linkage mechanism pivotally mounted on the other end of said arbor, a spring interposed between said frame and linkage mechanism and cooperating therewith for cushioning the movement of said arbor to the horizontal position, a latch associated with said arbor and frame for restraining the arbor against movement of the wheel supporting end thereof below its horizontal position and for automatically locking said arbor when the wheel supporting end thereof is in vertical position, and means for unlocking said latch.

21. A wheel balancer comprising a frame, an arbor on said frame and movable to vertical and horizontal positions, a wheel support rotatably mounted and universally tiltable on said arbor, and means for automatically locking the wheel support against tilting movement upon movement of the arbor to horizontal position.

22. A wheel balancer comprising a frame, an arbor on said frame and movable to vertical and horizontal positions, a wheel support rotatably mounted and universally tiltable on said arbor, means for automatically locking the wheel support against tilting movement upon movement of the arbor to horizontal position, and means for holding said arbor in either position.

23. A wheel balancer comprising a frame, an arbor on said frame movable to vertical and horizontal positions, a wheel support rotatably mounted and universally tiltable on said arbor, means for automatically locking the wheel support against tilting movement upon movement of the arbor to horizontal position, and means for automatically unlocking said wheel support upon movement of the arbor to vertical position.

24. A wheel balancer comprising a frame, an arbor on said frame movable to vertical and horizontal positions, means for holding said arbor in either position, a wheel support rotatably mounted and universally tiltable on said arbor, means for automatically locking the wheel support against tilting movement upon movement of the arbor to horizontal position, and means for automatically unlocking said wheel support upon movement of the arbor to vertical position.

HERBERT G. HOLMES.